US012762529B2

(12) United States Patent
Jalgaonkar et al.

(10) Patent No.: US 12,762,529 B2
(45) Date of Patent: Oct. 13, 2026

(54) MULTI-FUNCTION DEVICE HAVING DYNAMIC TOGGLE CAPABILITIES

(71) Applicant: Bank of America Corporation, Charlotte, NC (US)

(72) Inventors: Deepti Anant Jalgaonkar, Mumbai (IN); Shikhu Goyal, Gurugram (IN); Saurabh Garg, Faridabad (IN); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 62 days.

(21) Appl. No.: 18/667,371

(22) Filed: May 17, 2024

(65) Prior Publication Data

US 2025/0356333 A1 Nov. 20, 2025

(51) Int. Cl.

*G06Q 20/22* (2012.01)
*G06Q 20/38* (2012.01)
*G06Q 20/40* (2012.01)

(52) U.S. Cl.

CPC ......... *G06Q 20/223* (2013.01); *G06Q 20/389* (2013.01); *G06Q 20/401* (2013.01)

(58) Field of Classification Search

CPC ... G06Q 20/223; G06Q 20/389; G06Q 20/401
See application file for complete search history.

(56) References Cited

U.S. PATENT DOCUMENTS

| | | | |
|---|---|---|---|
| 7,917,749 | B2 | 3/2011 | Ginter et al. |
| 10,833,848 | B1 | 11/2020 | Zhuo |
| 11,153,072 | B2 | 10/2021 | Wei et al. |

(Continued)

FOREIGN PATENT DOCUMENTS

| | | |
|---|---|---|
| CA | 2948116 C | 10/2022 |

OTHER PUBLICATIONS

The Provenance Team. "What's the score? Transparency and the rise of eco rating," https://www.provenance.org/news-insights/whats-the-score-transparency-and-the-rise-of-eco-rating (Aug. 21, 2023). (Year: 2023).*

*Primary Examiner* — Elizabeth H Rosen
(74) *Attorney, Agent, or Firm* — Banner & Witcoff, Ltd.

(57) ABSTRACT

Arrangements for providing multi-functionality device control functions are provided. In some aspects, a request for transaction may be received by a computing platform. The request may include transaction details including selection of a mode of processing, received from a payment device. The computing platform may determine whether the selected mode of payment is crypto currency. If so, the transaction details may be transmitted to a peer-to-peer network for validation of the transaction. If the transaction is validated, a new block, corresponding to the validated transaction, may be generated and added to a blockchain and the transaction may be processed. In some examples, additional details of the transaction may be received and the additional details and the transaction details may be input to a machine learning model. Upon execution of the model, an environmental impact score associated with the transaction and a recommendation may be determined and transmitted to the user.

12 Claims, 13 Drawing Sheets

(56) References Cited

U.S. PATENT DOCUMENTS

| | | | | |
|---|---|---|---|---|
| 11,741,470 | B1 * | 8/2023 | Kurani | G06Q 20/102<br>705/75 |
| 2014/0029051 | A1 | 1/2014 | Kitada | |
| 2014/0172531 | A1 | 6/2014 | Liberty et al. | |
| 2016/0307189 | A1 * | 10/2016 | Zarakas | G06K 19/02 |
| 2017/0242852 | A1 | 8/2017 | Clain | |
| 2018/0150838 | A1 * | 5/2018 | Ausems | G06Q 20/4012 |
| 2018/0308116 | A1 * | 10/2018 | Maggio | G06Q 20/3672 |
| 2021/0383405 | A1 * | 12/2021 | Mostyn | G06F 21/6245 |
| 2022/0207552 | A1 * | 6/2022 | Normand | G06Q 30/0631 |
| 2022/0214668 | A1 * | 7/2022 | King | G05B 19/4183 |

* cited by examiner

MULTI-FUNCTION DEVICE HAVING DYNAMIC TOGGLE CAPABILITIES

BACKGROUND

Aspects of the disclosure relate to electrical computers, systems, and devices for providing real-time functionality modification of a payment device and analyzing an environmental impact of transactions in real-time.

Despite various payment options available, consumer use of physical payment devices, such as debit cards, credit cards, and the like, continues to be extremely common. However, a user may wish to use different payment devices in different scenarios. For instance, for a low-cost purchase (e.g., a coffee at a coffee shop) the user may wish to use a debit card to complete the purchase. For higher cost purchases (e.g., a new appliance) the user may wish to use a credit card. Accordingly, in conventional arrangements, having the flexibility to use credit or debit functionality as desired may require the user to carry two payment devices (e.g., a debit card and a separate credit card).

Further, as use of cryptocurrency increases, facilitating transaction processing using cryptocurrency adds additional burden to a user. In addition, for those unfamiliar with cryptocurrency, it can be daunting to begin using cryptocurrency in conventional purchase arrangements (e.g., at a retailer, or the like).

Further still, users might not be aware of an environmental impact of the products being purchased, which can lead to uninformed decision making. Accordingly, it would be advantageous to provide a multi-functionality payment device that enables debit, credit and cryptocurrency transaction processing with a single card, while leveraging machine learning to evaluate environmental impact of purchases and notify a user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with providing payment devices having different types of functionality and determining an environmental impact of a purchase.

In some aspects, a request for transaction may be received by a computing platform. The request for transaction may include transaction details including selection of a mode of processing, received from a payment device, and selected by a user via one or more selectable options on the payment device. The computing platform may determine whether the selected mode of payment is crypto currency. If so, the transaction details may be transmitted to a peer-to-peer network for validation of the transaction. If the transaction is validated, a new block, corresponding to the validated transaction, may be generated and added to a blockchain and the transaction may be processed.

In some examples, additional details of the transaction may be received. For instance, details related to the item purchased, a manufacturer of the item, or the like, may be received. In some examples, the additional details may be read from a machine-readable code associated with the product. The additional details and the transaction details may be input to a machine learning model. Upon execution of the machine learning model, an environmental impact score associated with the transaction may be determined. In some examples, one or more recommendations for the user may be generated and transmitted to the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, users who desire to have the flexibility to use debit functionality for some transactions, credit functionality for some transactions and crypto currency functionality for some transactions may have to carry multiple separate payment devices (e.g., a debit card, credit card, crypto device, and the like). This can be cumbersome and inefficient. However, carrying only one type of payment device may leave users in situations where a merchant may only accept, for instance, a debit payment (e.g., in cases of low-cost purchases, such as under $10).

Further, as discussed, conventional arrangements do not evaluate or communicate to users an environmental impact of a transaction or purchase. Accordingly, arrangements provided herein provide for real-time carbon analysis of transactions and/or purchases to determine an environmental impact and provide recommendations to the user.

For instance, a payment card may include a plurality of selectable buttons or options, each associated with a different mode of functionality (e.g., credit, debit, crypto). If crypto currency is selected, when a transaction request is received, the transaction details may be transmitted to a peer-to-peer network to validate the transaction. If the transaction is validated, the transaction details may be added to a blockchain and the transaction may be processed.

Additional details related to the product purchased or the transaction may be received and input, along with the transaction details, to a machine learning model. The machine learning model may output an environmental impact score and one or more recommendations to the user. The recommendations may be transmitted or sent to a user device for display.

These and various other arrangements will be discussed more fully below.

Figure 1A:
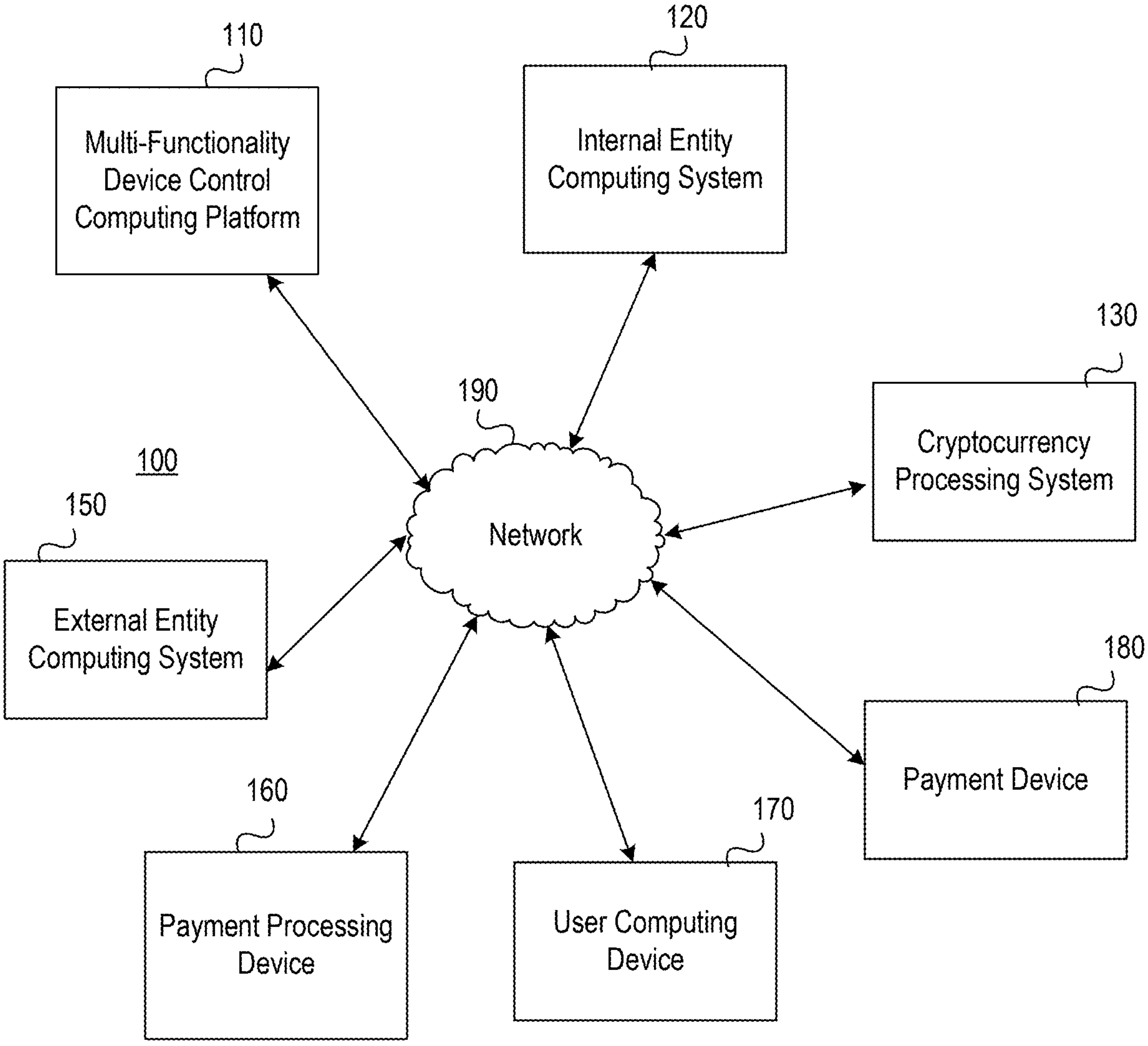
FIGS. 1A-1D depict an illustrative computing environment and devices for implementing multi-functionality device control functions in accordance with one or more aspects described herein.

FIGS. 1A-ID depict an illustrative computing environment for implementing dynamic, real-time device functionality modification and environmental impact analysis in accordance with one or more aspects described herein. Referring to FIG. 1A, computing environment 100 may include one or more computing devices and/or other computing systems. For example, computing environment 100 may include multi-functionality device control computing platform 110, internal entity computing system 120, cryptocurrency processing system 130, external entity computing system 150, payment processing system or device 160, user computing device 170, and/or payment device 180. Although one internal entity computing system 120, one cryptocurrency processing system 130, one external entity computing system 150, one payment processing system or device 160, one user computing device 170 and one payment device 180 are shown, any number of systems or devices may be used without departing from the invention.

Multi-functionality device control computing platform 110 may be configured to perform intelligent, dynamic, real-time device functionality modification. For instance, multi-functionality device control computing platform 110 may be configured to receive a selection of a mode of processing, as well as a request to process a transaction from a payment processing device 160 (e.g., a point-of-sale system, an online retails payment processing system or the like). For instance, in some examples, the request to process the transaction may include a selection, by a user, of a mode of functionality (e.g., debit, credit or cryptocurrency) of the payment device. In some examples, the selection of the mode may be made by selecting an option of three or more available options provided on the payment device 180 (e.g., as physical buttons available for selection on a surface or face of the payment device 180).

Upon receiving the request, multi-functionality device control computing platform 110 may determine a type of mode of processing (e.g., debit, credit or cryptocurrency). Responsive to determining that the selected mode is cryptocurrency, the multi-functionality device control computing platform 110 may execute a data exchange format process to orchestrate data transmission between the payment processing device 160 and a cryptocurrency processing system or device 130. The multi-functionality device control computing platform 110 may transmit or send the formatted data associated with details of the requested transaction to a peer-to-peer network of computing devices for validation. Upon receiving an indication that the transaction is validated, the transaction may be recorded in a blockchain (e.g., a block corresponding to the validated transaction may be added to a blockchain). The multi-functionality device control computing platform 110 may the process the transaction (e.g., orchestrate transaction processing between the payment processing device 160 and the cryptocurrency processing system 130.

The multi-functionality device control computing platform 110 may receive additional details of the product being purchased or a manufacturer of the product. For instance, details related to sustainability of the manufacturing processes, use of recycled or recyclable materials in manufacturing the product, and the like, may be received. In some examples, the details may be captured from a machine-readable code associated with the product and/or some details may be extracted from the machine-readable code and used to access additional information or details about the product, manufacturer, or the like.

The multi-functionality device control computing platform 110 may execute a machine learning model using, as inputs, the transaction details and details associated with the product or manufacturer to output an environmental impact score associated with the transaction. Based on the generated score, one or more recommendations for the user may be generated. For instance, recommendations related to alternative products, alternative manufacturers of a same or similar product, or the like, may be generated and transmitted to a user computing device 170 for display.

Computing environment 100 may further include internal entity computing system 120 that may be or include one or more computing systems, devices, or the like, that may host or execute one or more applications of an enterprise organization. For instance, internal entity computing system 120 may host or execute one or more applications in use by an enterprise organization (e.g., to process transactions, open new accounts, and the like). In some examples, internal entity computing system 120 may store user data, account data, and the like. In some arrangements, internal entity computing system 120 may store real time account balance data that may be retrieved by multi-functionality device control computing platform 110 to determine whether a requested transaction may be authorized (e.g., whether an account includes a sufficient balance, whether a credit limit is sufficient, or the like). In some arrangements, internal entity computing system 120 may receive and display one or more notifications.

Computing environment 100 may further include cryptocurrency processing system 130 that may include one or more computing devices (e.g., servers, server blade, and the like) and/or other computing components (e.g., memory, processor, or the like) configured to process cryptocurrency transactions. In some examples, cryptocurrency processing system 130 may include a peer-to-peer network of computing devices used to validate requested transactions.

External entity computing system 150 may be or include one or more transaction processing systems. In some arrangements, one or more of external entity computing system 150 may include an external entity transaction processing system or service. For instance, external entity computing system 150 may be associated with one or more financial institutions other than the enterprise organization, one or more credit card providers, or the like. Accordingly, upon authorizing a transaction (such as a debit or credit card transaction), in some examples, instructions to process a transaction may be sent or transmitted to external entity computing system 150 for processing.

Computing environment 100 may further include a payment processing device 160. In some examples, a payment processing device may include a point-of-sale system at a retail location, an online retailer payment processing system, or the like. The payment processing device 160 may be configured to process debit and credit transaction and, in some examples, may rely on orchestration by the multi-functionality device control computing platform 110 to process cryptocurrency transactions.

User computing device 170 may include a computing device (e.g., laptop, desktop, mobile device, wearable device, or the like) associated with a user and may be configured to receiving and display notifications from the multi-functionality device control computing platform 110.

Payment device 180 may be a standard "credit card" style device having a generally planar surface and including a plurality of selectable options, each option associated with a different mode of processing (e.g., debit, credit, cryptocurrency). In some examples, the selectable options may include physical buttons arranged on a surface or face of the generally planar surface of the payment device 180. In some examples, a visual indicator identifying a selected mode of processing may be associated with each selectable option.

Figure 1B:
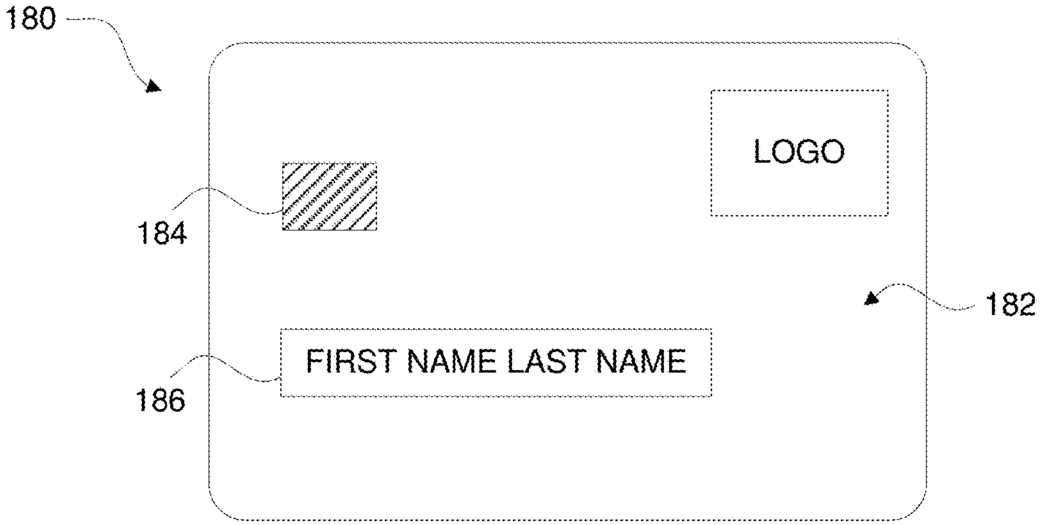
Figure 1C:
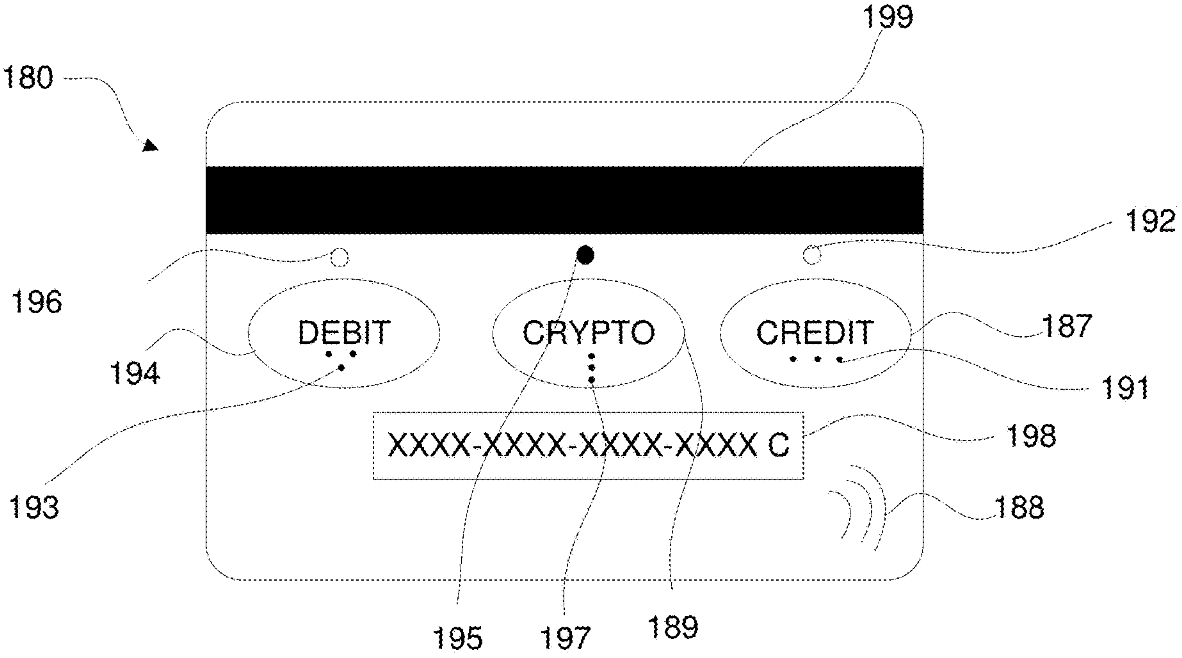

For instance, FIGS. 1B and 1C illustrate front and back views, respectively, of one example payment device 180 that may be used in accordance with one or more aspects described herein. For instance, FIG. 1B illustrates a front view of payment device 180, while FIG. 1C illustrates an opposite or rear view of the payment device 180.

In some examples, the payment device 180 may include a generally planar region 182 including payment processing components, such as a user name region 186, smart chip 184, near field communication 188, magnetic data strip 199, and the like. In some examples, the payment device 180 may include selectable buttons or options 187, 189, 194, for a user to select a type of functionality (e.g., crypto 189, debit 194 or credit 187). For instance, the payment device 180 may include a selectable option or physical button 194 for the user to select when debit functionality is desired, a selectable option or button 187 for the user to select when credit functionality is desired and a selectable option or button 189 for the user to select when crypto functionality is desired. In some examples, the payment device 180 may include at least three selectable options and pressing the option may toggle the selected option on or off. In some arrangements, the selectable options on payment device 180 may include a haptic region 191, 193, 197 that may enable selection of an option for visually impaired users (e.g., debit option raised indicators 193, credit option raised indicators 191, and crypto option raised indicators 197). In some examples, each selectable option may be associated with a visual indicator 192, 195, 196 that may illuminate when the option is selected. For instance, as shown in FIG. 1C, visual indicator 195 is filled indicating that the indicator 195 is illuminated to note that a crypto option is selected. In some examples, each visual indicator may illuminate in a different color to provide simplified differentiation to a user of the selected mode of functionality or processing.

Further, in some examples, the payment device 180 may include a display screen or region 198. The display screen 198 may be used to provide a visual indication of a dynamically generated device identifier (e.g., XXXX-XXXX-XXXX-XXXX C). In some examples, the "C" may be a flag indicating that crypto has been selected. In some examples, the dynamically generated device identifier may be a non-fungible token. In some examples, the display screen 198 may also be used to provide a visual indication of whether a requested transaction was successfully processed, and/or may provide additional notifications to the user (e.g., low balance on account, or the like).

As mentioned above, computing environment 100 also may include one or more networks, which may interconnect one or more of multi-functionality device control computing platform 110, internal entity computing system 120, cryptocurrency processing system 130, external entity computing system 150, payment processing device 160, user computing device 170, and/or payment device 180. For example, computing environment 100 may include network 190, which may be a public or private network. Network 190 may include one or more sub-networks (e.g., Local Area Networks (LANs), Wide Area Networks (WANs), or the like). Network 190 may interconnect one or more computing devices associated with the organization. For example, of multi-functionality device control computing platform 110, internal entity computing system 120, cryptocurrency processing system 130, external entity computing system 150, payment processing device 160, user computing device 170, and/or payment device 180 may be connected via network 190 to interconnect of multi-functionality device control computing platform 110, internal entity computing system 120, cryptocurrency processing system 130, external entity computing system 150, payment processing device 160, user computing device 170, and/or payment device 180.

Figure 1D:
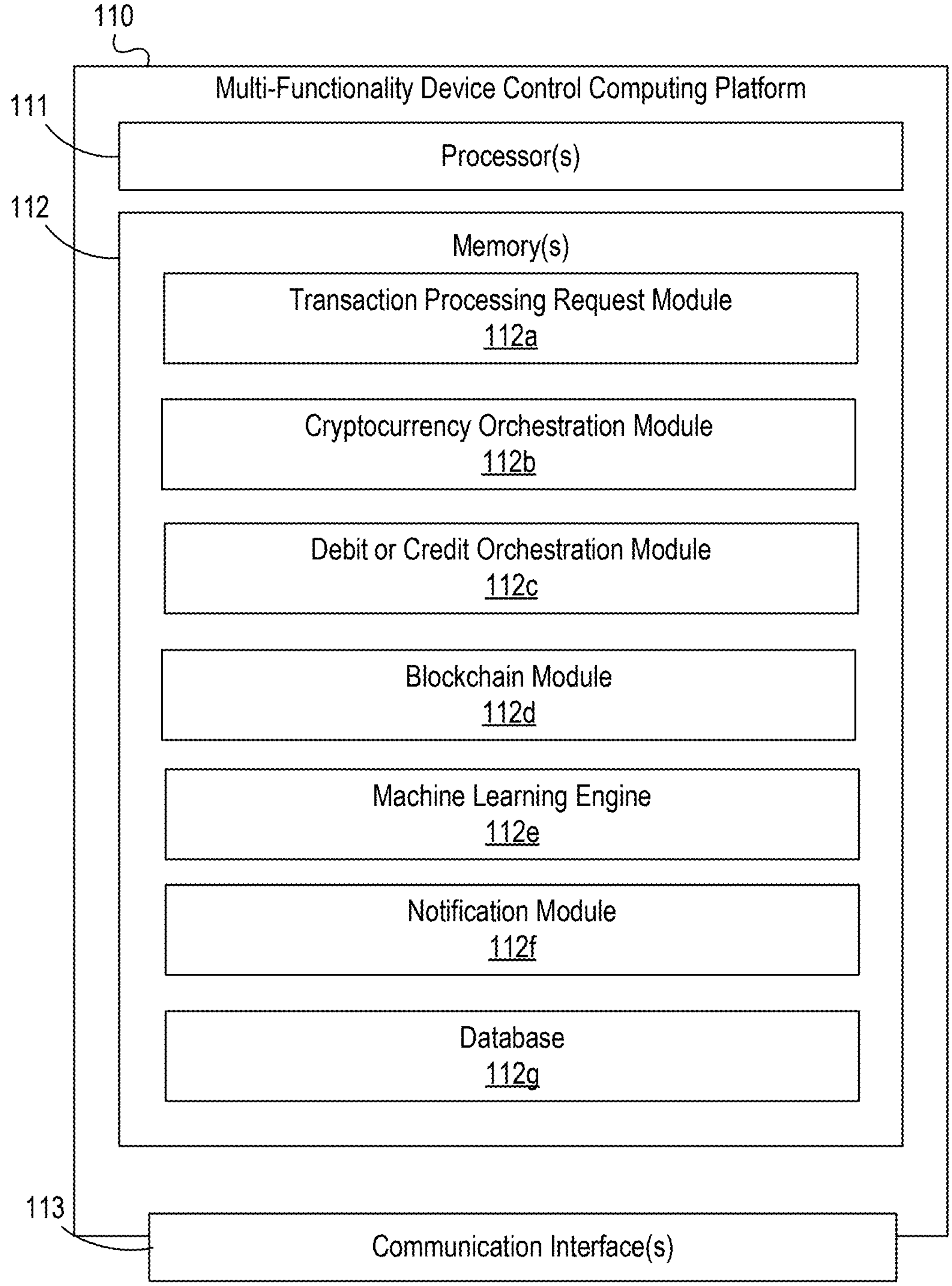

Referring to FIG. 1D, multi-functionality device control computing platform 110 may include one or more processors 111, memory 112, and communication interface 113. A data bus may interconnect processor(s) 111, memory 112, and communication interface 113.

Communication interface 113 may be a network interface configured to support communication between multi-functionality device control computing platform 110 and one or more networks (e.g., network 190 or the like). Memory 112 may include one or more program modules having instructions that when executed by processor(s) 111 cause multi-functionality device control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of multi-functionality device control computing platform 110 and/or by different computing devices that may form and/or otherwise make up multi-functionality device control computing platform 110.

For example, memory 112 may have, store and/or include transaction processing request module 112*a*. Transaction processing request module 112*a* may store instructions and/or data that may cause or enable the multi-functionality device control computing platform 110 to receive a request to process a transaction, such as from a payment processing device 160, using a payment device 180. In some examples, the request may include an indication of a selection of a mode of processing for the payment device 180 (e.g., debit, credit or cryptocurrency). In some arrangements, details of the requested transaction may also be received.

Multi-functionality device control computing platform 110 may further have, store and/or include cryptocurrency orchestration module 112*b*. Cryptocurrency orchestration module 112*b* may store instructions and/or data that may cause or enable the multi-functionality device control computing platform 110 to identify, for a request to process a transaction, selection of a cryptocurrency option and execute a data exchange formatting process to facilitate execution of the cryptocurrency transaction. In some examples, new distribution capability may be used to orchestrate data exchange over a distributed channel. This may enable exchange of data between end-to-end systems using, for instance, a data exchange format message. In some examples, generative artificial intelligence may be used to couple the various payment infrastructures (e.g., traditional debit/credit infrastructure with cryptocurrency infrastructure) to enable seamless use of a cryptocurrency as a transaction platform. In some examples, the cryptocurrency orchestration module 112*b* may communicate or work in conjunction with cryptocurrency processing system 130 and may include a peer-to-peer (P2P) network of computing devices configured to confirm validity of a requested transaction prior to storing the transaction in a blockchain or processing the cryptocurrency transaction. Cryptocurrency orchestration module 112*b* may then communicate with cryptocurrency processing system 130 to process a validated cryptocurrency transaction.

Multi-functionality device control computing platform 110 may further have, store and/or include debit or credit orchestration module 112*c*. Debit or credit orchestration module 112*c* may store instructions and/or data that may cause or enable the multi-functionality device control computing platform 110 to communicate with another system (e.g., internal entity computing system 120, external entity computing system 150, or the like) to facilitate processing of a requested debit or credit transaction.

Multi-functionality device control computing platform 110 may further have, store, and/or include blockchain module 112*d*. Blockchain module 112*d* may include one or more distributed ledgers and may be configured to receive validated cryptocurrency transaction data and store the data in the blockchain. For instance, upon receiving an indication of validity of a requested cryptocurrency transaction, the requested transaction, and associated transaction details may be stored in a new block of the blockchain generated for that particular transaction. Accordingly, security of the transaction and associated data is improved by storing the data in a blockchain where it may be permanently stored and cannot be modified.

Multi-functionality device control computing platform 110 may further have, store and/or include machine learning engine 112*e*. Machine learning engine 112*e* may store instructions and/or data that may cause or enable the multi-functionality device control computing platform 110 to train, execute, update and/or validate one or more machine learning models to receive, as inputs, product data associated with a transaction, manufacturer data associated with a transaction, and the like, and generate or output an environmental impact score associated with the transaction, and/or one or more recommendations for the user.

The machine learning model may be trained using previously captured and/or historical product and/or manufacturer data (e.g., materials used, sustainability data, and the like). For instance, data associated with particular materials or sustainability initiatives or efforts may be used to train a machine learning model to identify an environment impact score for a product by identifying sequences, patterns or correlations between various materials, manufacturing processes, manufacturers, and the like, and an environment impact. The machine learning model may be further trained to generate one or more recommendations for a user (e.g., alternative manufactures having better scoring parameters, alternative products, or the like).

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data including location data, user input data, user communication content data, and the like) and/or unlabeled data.

Accordingly, machine learning engine 112*e* may receive, as inputs to the machine learning model, current product and/or manufacturer data and may identify an environmental impact score, as well as any recommendations. In some examples, the product and/or manufacturer data may be determined from a machine-readable code (e.g., bar code, quick response code, universal product code (UPC), or the like) associated with the product.

Multi-functionality device control computing platform 110 may further have, store and/or include notification module 112*f*. Notification module 112*f* may store instructions and/or data that may cause or enable the multi-functionality device control computing platform 110 to generate one or more notifications (e.g., environmental impact notifications, recommendation notifications, or the like) and transmit or send the notification to, for instance, user computing device 170.

Multi-Functionality device control computing platform 110 may further have, store and/or include a database 112*g*. Database 112*g* may store transaction data, blockchain data, recommendation data, environmental impact data, and/or any other data that may be used by multi-functionality device control computing platform 110 to perform the functions described here.

FIGS. 2A-2F depict one example illustrative event sequence for implementing a multi-function device having dynamic toggle capabilities to process various transactions in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
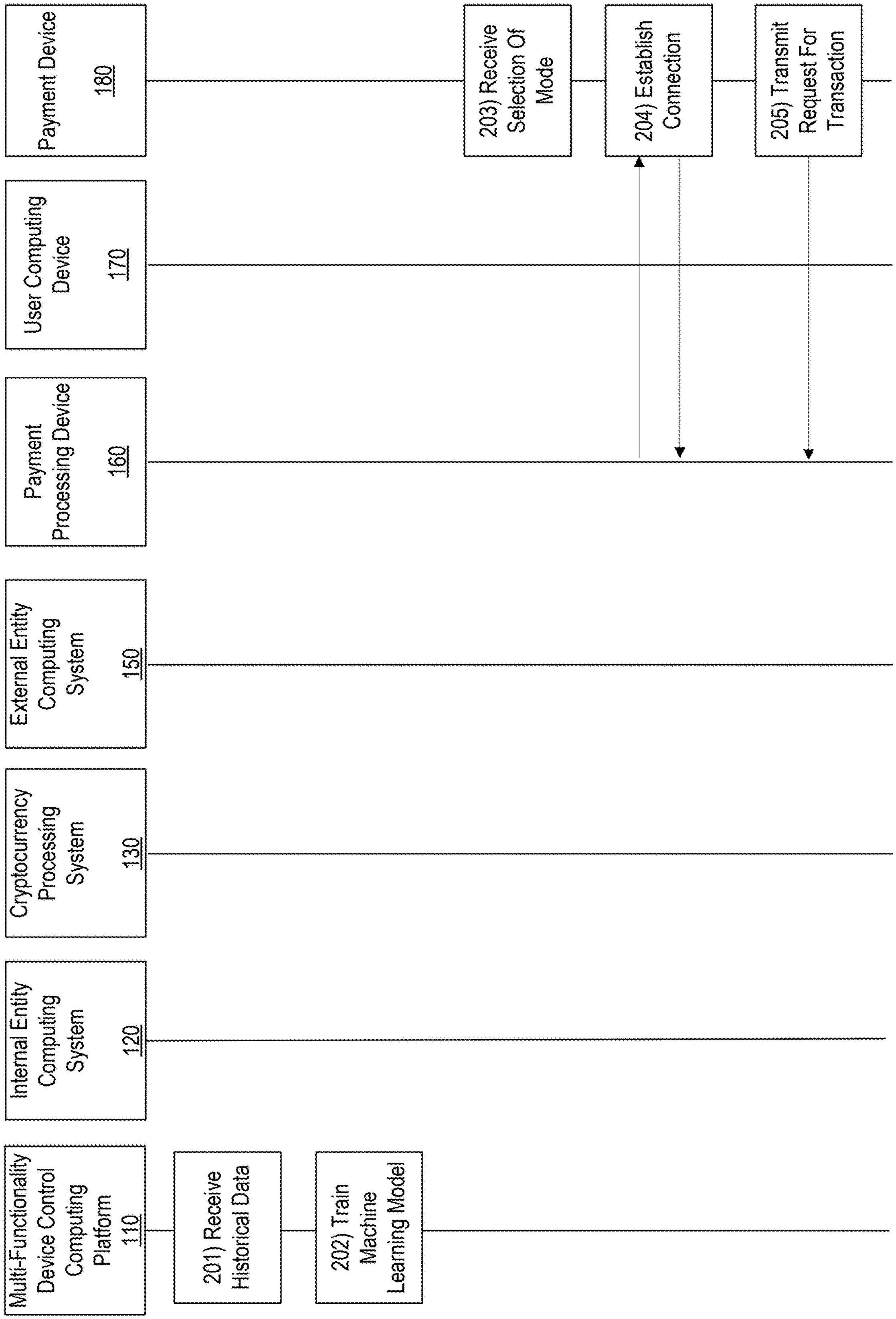
FIGS. 2A-2F depict an illustrative event sequence for implementing multi-functionality device control functions in accordance with one or more aspects described herein.

With reference to FIG. 2A, at step 201, multi-functionality device control computing platform 110 may receive historical purchase data. For instance, data associated with various products, materials used to manufacture the products, manufacturer data, sustainability data, and the like may be received.

At step 202, multi-functionality device control computing platform 110 may train a machine learning model. For instance, the multi-functionality device control computing platform 110 may train the machine learning model, using the received historical data, to identify patterns, sequences or correlations in product data and output an environmental impact score associated with a purchase, as well as one or more recommendations.

At step 203, a payment device 180 may receive selection of a mode of processing. For instance, payment device 180 may have a form or shape similar to a convention debit or credit card but may include a plurality of selectable options or buttons arranged on a surface of the card with each selectable option corresponding to a different mode of processing a transaction (e.g., debit, credit, cryptocurrency).

At step 204, payment device 180 may establish a connection with payment processing device 160. For instance, a first wireless connection may be established between payment device 180 and payment processing device 160. Upon establishing the first wireless connection, a communication session may be initiated between payment device 180 and payment processing device 160. In some examples, payment processing device 160 may be a point-of-sale device and the communication may be established using, for instance, near-field communication. Additionally or alternatively, the payment processing device may be an on-line retailer payment processing device 160.

At step 205, payment device 180 may transmit or send a request to process a transaction to payment processing device 160. For instance, the request to process the transaction may be transmitted or sent during the communication session initiated upon establishing the first wireless connection.

Figure 2B:
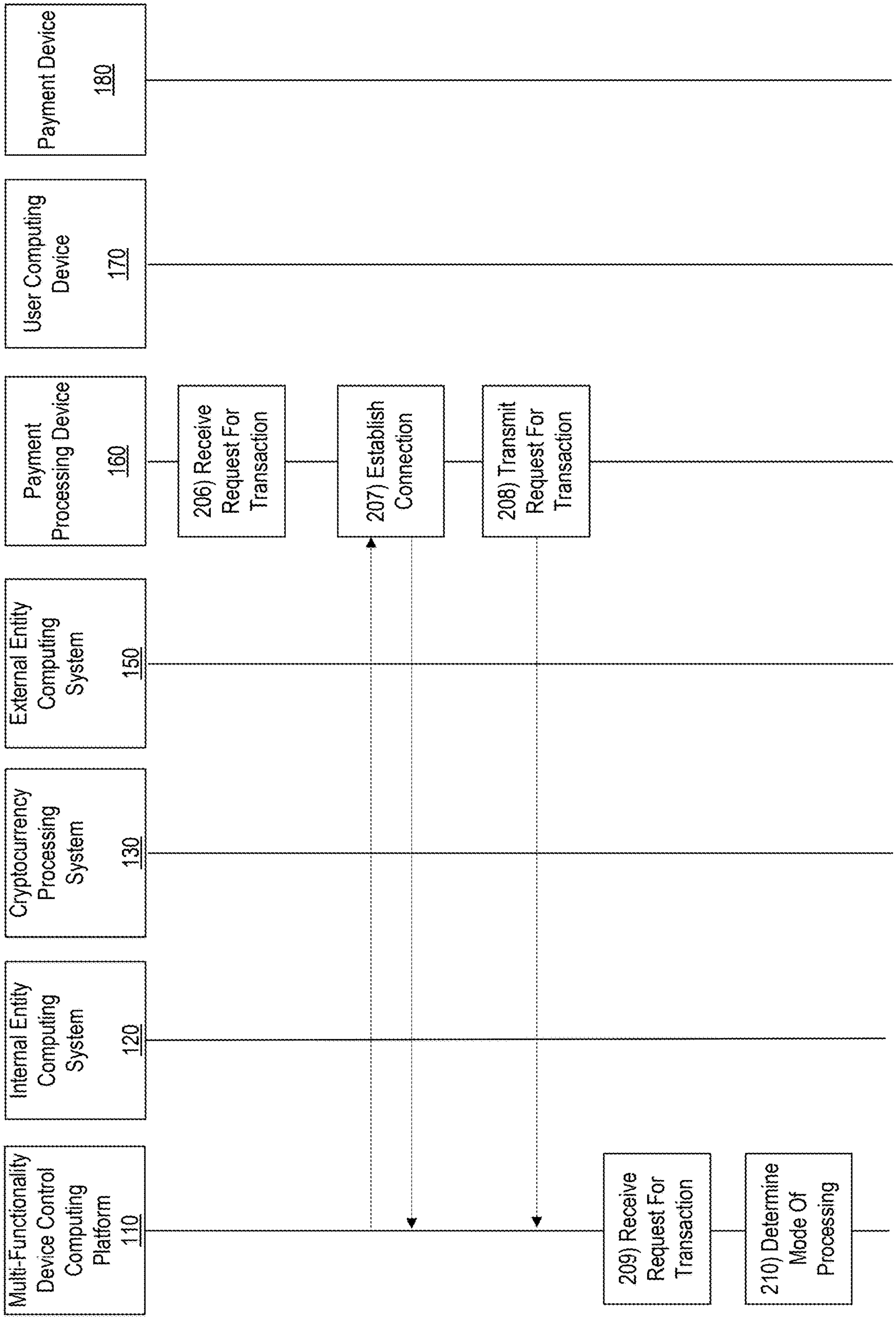

With reference to FIG. 2B, at step 206, the payment processing device 160 may receive the request to process the transaction transmitted at step 205.

At step 207, payment processing device 160 may establish a connection with multi-functionality device control computing platform 110. For instance, a second wireless connection may be established between payment processing device 160 and multi-functionality device control computing platform 110. Upon establishing the second wireless connection, a communication session may be initiated between payment processing device 160 and multi-functionality device control computing platform 110.

At step 208, the payment processing device 160 may transmit or send the request to process the transaction to the multi-functionality device control computing platform 110. For instance, the request to process the transaction may be transmitted or sent during the communication session initiated upon establishing the second wireless connection. In some examples, transmitting or sending the request to process the transaction may include transaction details (e.g., amount, item being purchased, seller name, and the like) as well as information related to the payment mode being used (e.g., selected mode of processing, account number, card holder name, expiration date, and the like).

At step 209, the multi-functionality device control computing platform 110 may receive the request to process the transaction sent at step 208.

At step 210, the multi-functionality device control computing platform 110 may determine, from the received data, the selected mode of processing associated with the transaction and selected on the physical payment device or card 180. The determined selected mode of processing may determine next steps in the process. For instance, if debit or credit is selected, the process may proceed to step 211-214 in FIG. 2C and then to step 223 in FIG. 2E. If cryptocurrency is selected, the process may proceed to step 215 in FIG. 2C without performing steps 211-214.

Figure 2C:
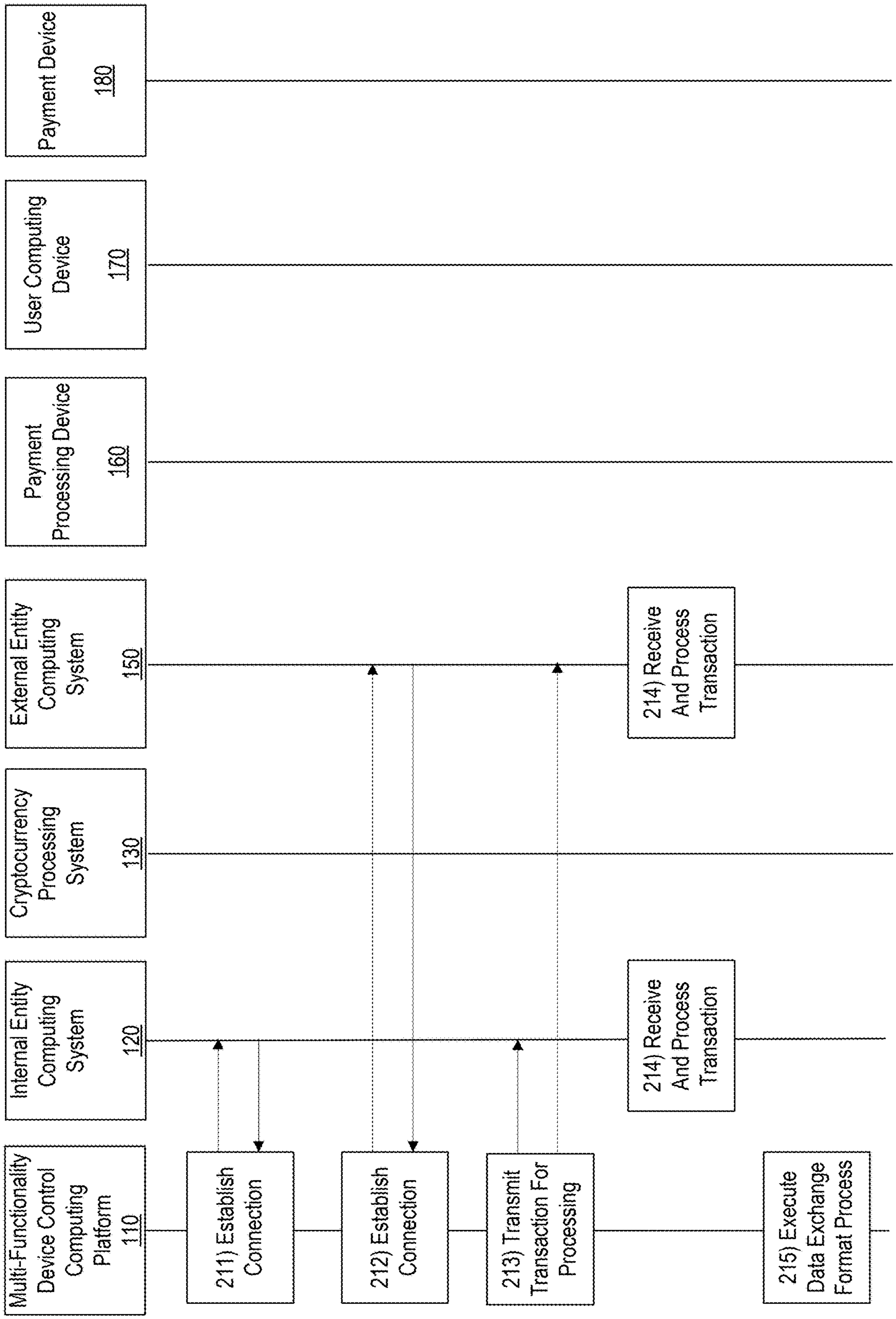

With reference to FIG. 2C, at step 211, multi-functionality device control computing platform 110 may establish a connection with internal entity computing system 120. For instance, a third wireless connection may be established between multi-functionality device control computing platform 110 and internal entity computing system 120. Upon establishing the third wireless connection, a communication session may be initiated between multi-functionality device control computing platform 110 and internal entity computing system 120.

At step 212, multi-functionality device control computing platform 110 may establish a connection with external entity computing system 150. For instance, a fourth wireless connection may be established between multi-functionality device control computing platform 110 and external entity computing system 150. Upon establishing the fourth wireless connection, a communication session may be initiated between multi-functionality device control computing platform 110 and external entity computing system 150.

At step 213, the transaction may be transmitted to one or more of internal entity computing system 120 or external entity computing system 150 for processing. For instance, if debit is selected, in some examples, that may be associated with a user account hosted by the enterprise organization implementing the system and processed via internal entity computing system 120. If credit is selected, in some examples, that may be hosted by a different entity and processed via external entity computing system 150. In some examples, debit transactions may be processed by external entity computing system 150 and/or credit transactions may be processed by internal entity computing system 120 without departing from the invention.

At step 214, one or more of internal entity computing system 120 and external entity computing system 150 may receive and process the transaction. The process may then proceed to step 223 in FIG. 2E.

At step 215, if cryptocurrency is the identified mode of processing selected via the payment device 180, multi-functionality device control computing platform 110 may execute a data exchange format process to facilitate or orchestrate communication with a cryptocurrency platform. For instance, new distribution capability may be used to orchestrate data exchange over a distributed channel. A data exchange format message may be used to exchange data between end-to-end systems.

Figure 2D:
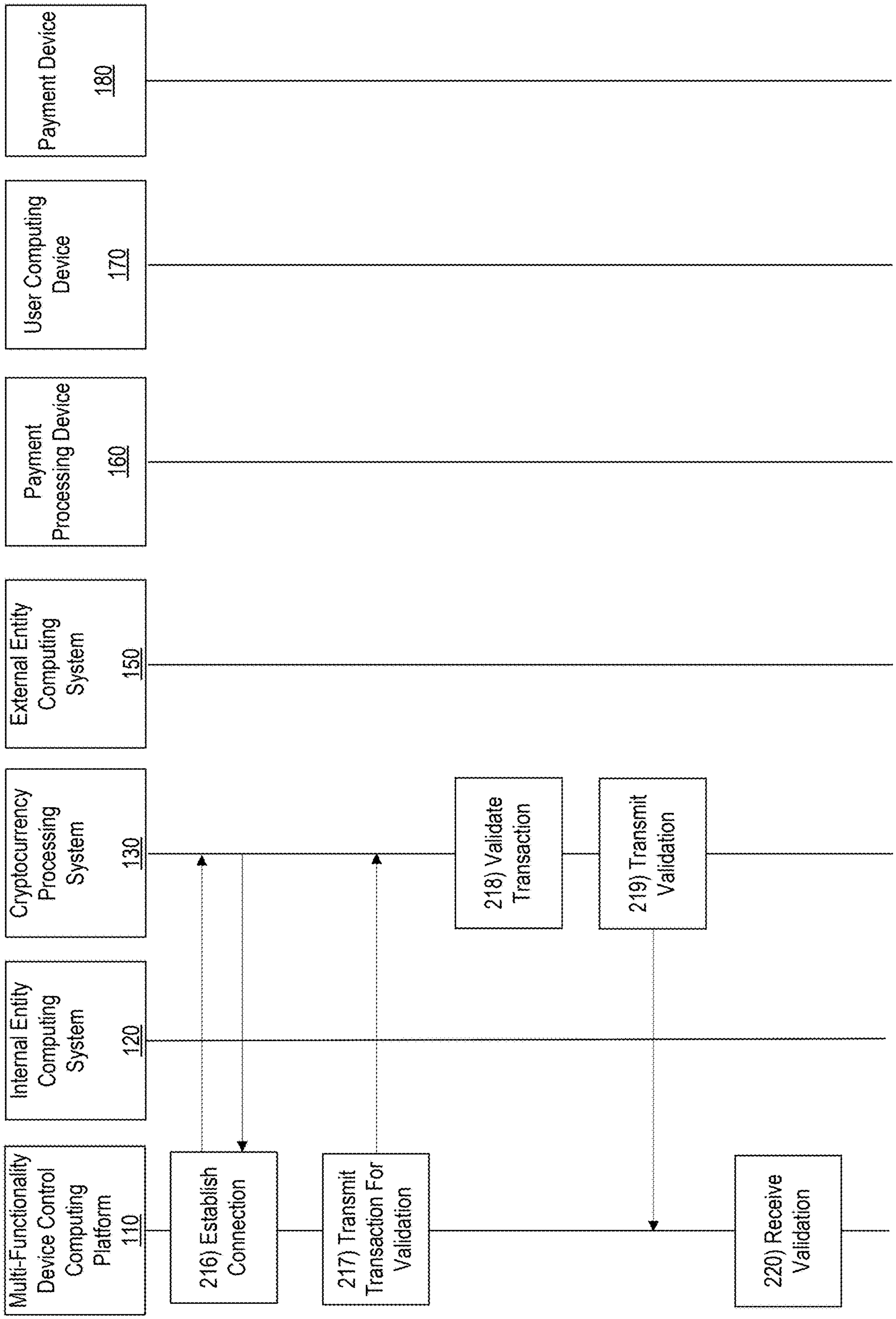

With reference to FIG. 2D, at step 216, multi-functionality device control computing platform 110 may establish a connection with cryptocurrency processing system 130. For instance, a fifth wireless connection may be established between multi-functionality device control computing platform 110 and cryptocurrency processing system 130. Upon establishing the fifth wireless connection, a communication session may be initiated between multi-functionality device control computing platform 110 and cryptocurrency processing system 130.

At step 217, multi-functionality device control computing platform 110 may transmit or send the transaction to the cryptocurrency processing system 130 for validation.

At step 218, cryptocurrency processing system 130 may validate the transaction. For instance, a peer-to-peer (P2P) network of computers may be used to validate the transaction. For instance, a consensus mechanism may be used that employs the nodes in the P2P network to solve complex mathematical computations in order to validate a transaction.

At step 219, the cryptocurrency processing system 130 may transmit or send the validation output to the multi-functionality device control computing platform 110.

At step 220, the multi-functionality device control computing platform 110 may receive the validation output. If the transaction is not validated (e.g., validation output=no) the process may end. If the transaction is validated (e.g., validation output=yes) the process may proceed to step 221 in FIG. 2E.

Figure 2E:
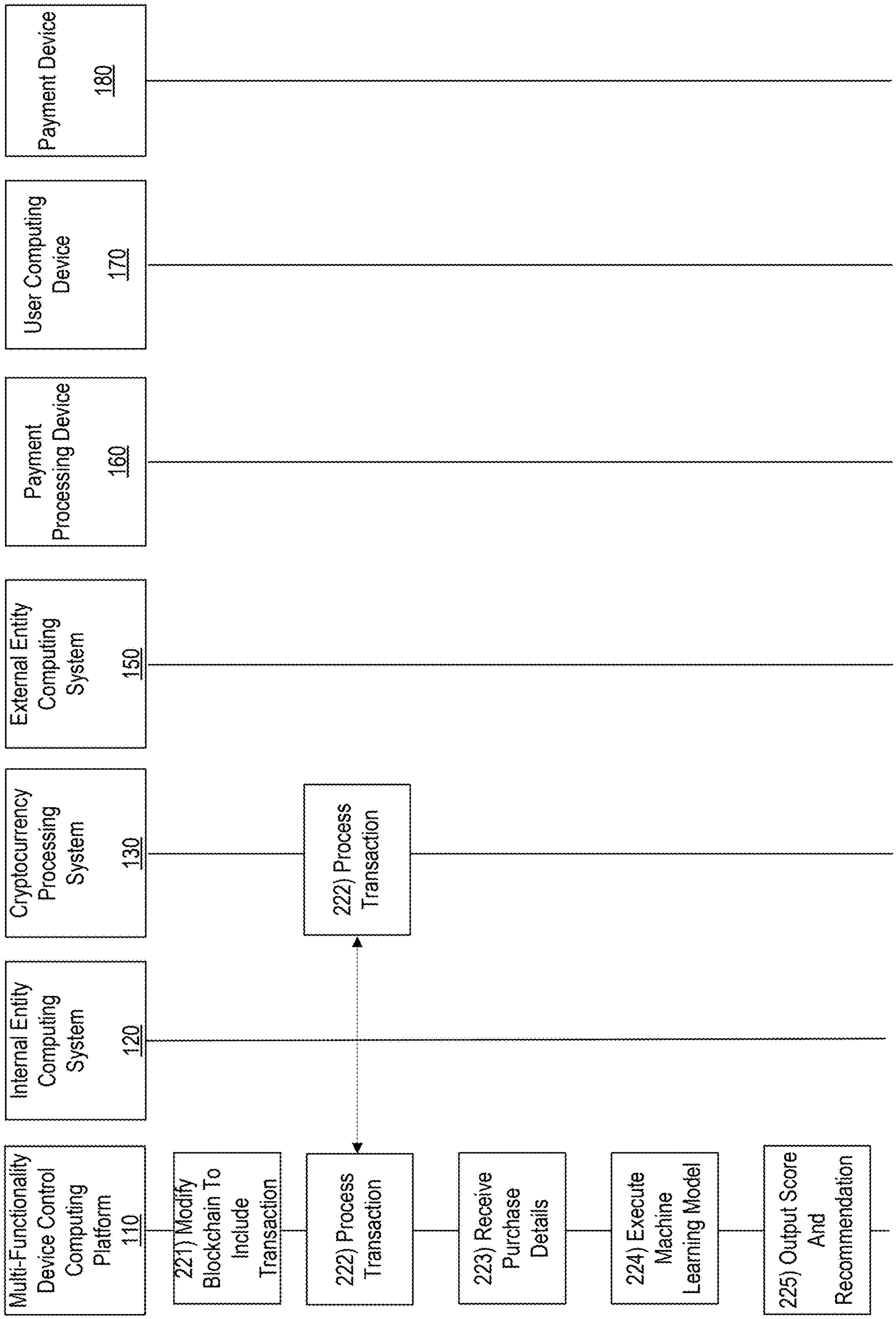

With reference to FIG. 2E, at step 221, if the transaction is validated, the transaction may be stored in the blockchain. For instance, a new block including the details of the validated transaction may be generated and added to the blockchain, thereby modifying the blockchain to permanently store the transaction details.

At step 222, the multi-functionality device control computing platform 110 and cryptocurrency processing system 130 may process the validated transaction.

At step 223, multi-functionality device control computing platform 110 may receive details related to the purchase. For instance, an item being purchased, manufacturer of the item, materials associated with the product, and the like, may be received. In some examples, information may be extracted from data received with the request to process the transaction. Additionally or alternatively, data may be extracted from a machine readable code associated with the product (e.g., the code may be scanned or read and data from the code received).

At step 224, multi-functionality device control computing platform 110 may execute the machine learning model using, as inputs, the received details related to the purchase. Upon execution of the model, the model may output an environmental impact score associated with the purchase and one or more recommendations at step 225. In some examples, the environmental impact score may be compared to one or more thresholds to determine one or more recommendations. For instance, if the score is above a first threshold but below a second threshold, the purchase may have little environmental impact and a recommendation may be a congratulatory message to continue making purchases of this nature. In another example, if the score is above a second threshold but below a third threshold, the purchase may have a moderate environmental impact and a recommendation may include suggesting an alternate manufacturer of the product that uses sustainable materials for a next purchase. In yet another example, if the score is above the third threshold, a recommendation may include an alternative product for a next purchase. The scores, thresholds and recommendations provided are merely some examples and various other arrangements may be used without departing from the invention.

Figure 2F:
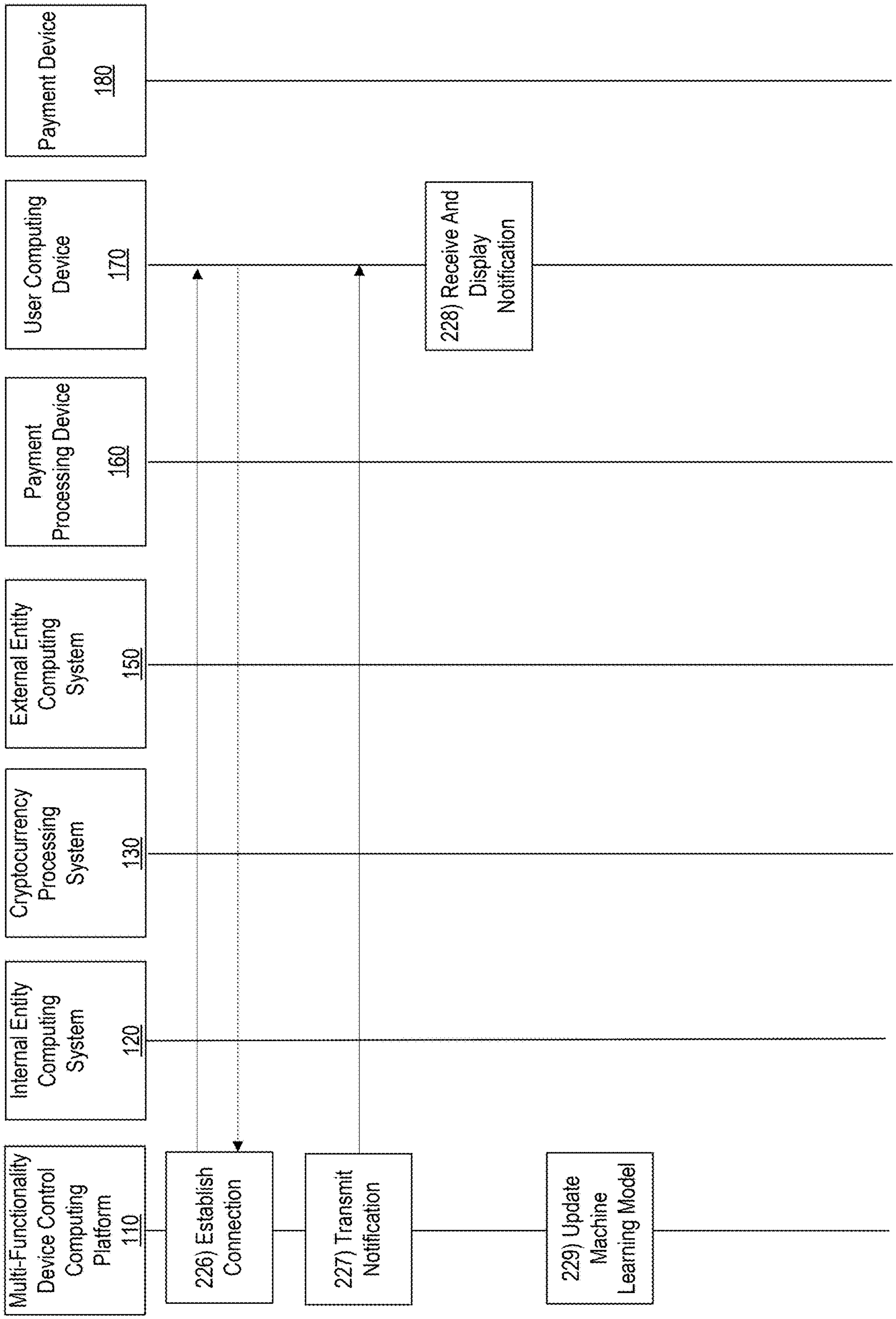

With reference to FIG. 2F, at step 226, multi-functionality device control computing platform 110 may establish a connection with user computing device 170. For instance, a sixth wireless connection may be established between multi-functionality device control computing platform 110 and user computing device 170. Upon establishing the sixth wireless connection, a communication session may be initiated between multi-functionality device control computing platform 110 and user computing device 170.

At step 227, multi-functionality device control computing platform 110 may transmit or send a notification including the generated recommendations to the user computing device. In some examples, transmitting or sending the notification may cause the notification to be displayed by a display of the user computing device 170.

Figure 4:
FIGS. 4-6 illustrate example user interfaces that may be generated in accordance with one or more aspects described herein.
Figure 5:
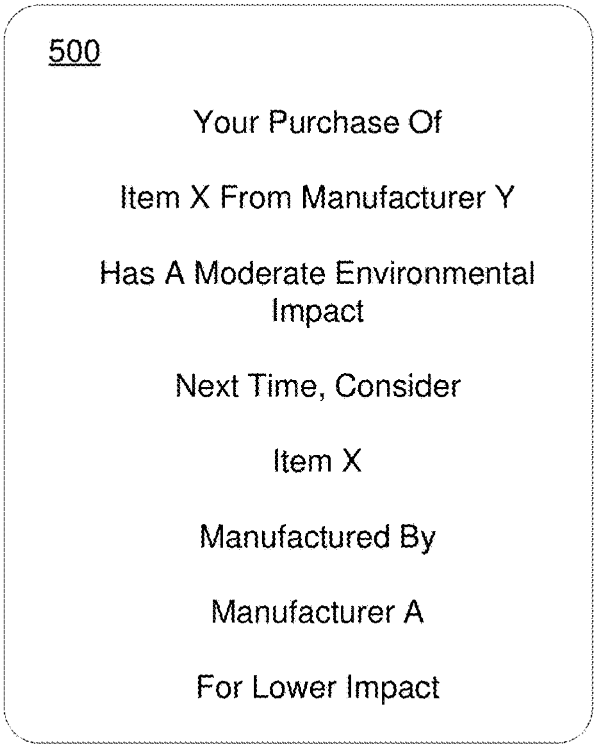
Figure 6:
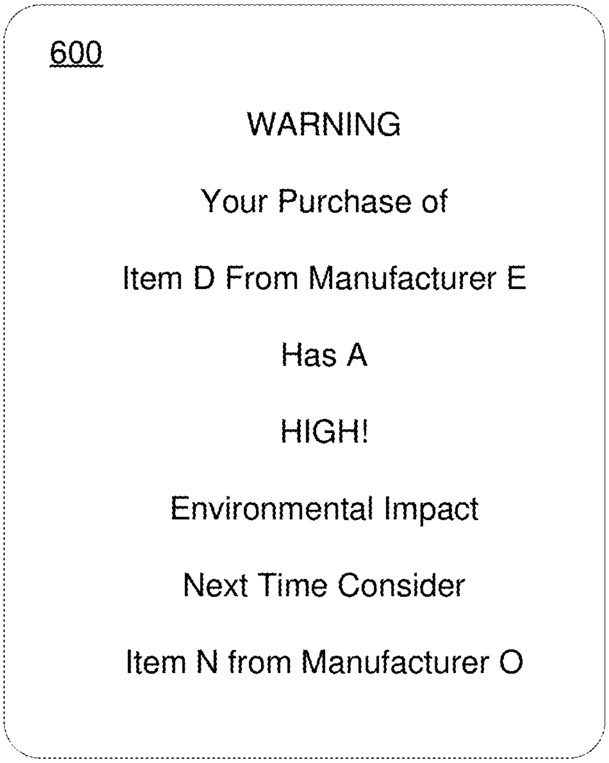

At step 228, the user computing device 170 may receive and display the notification. FIGS. 4-6 illustrate some example notifications including recommendations that may be output. For instance, FIG. 4 includes a user interface 400 including a recommendation to "keep up the good work" because the purchase made has a relatively low environmental impact. In some examples, the recommendation may further include additional products having a similar impact. In some examples, one or more rewards (e.g., rewards credits, cryptocurrency, or the like) may be provided to the user in response to the purchase having an impact below a threshold.

FIG. 5 illustrates another user interface 500 that may be generated and includes an identification of a recommended alternative manufacturer for a product. Accordingly, the next time a user purchases the product, the user may purchase from the identified manufacturer having less environmental impact.

FIG. 6 illustrates yet another user interface that may be generated and indicates that the impact of a product purchased was high and provides an alternative product/manufacturer for a next purchase.

With further reference to FIG. 2F, at step 229, multi-functionality device control computing platform 110 may update and/or validate the machine learning model. For instance, based on evaluated products, generated recommendations, and the like, the machine learning model may be updated via a dynamic feedback loop. Accordingly, the machine learning model may be continuously or near-continuously updated to improve accuracy in outputting environmental impact scores and recommendations.

In some instances, multi-functionality device control computing platform 110 may continuously update, validate, refine, or the like, the machine learning model. In some examples, the multi-functionality device control computing platform 110 may maintain an accuracy threshold for the machine learning model and may pause refinement (through the dynamic feedback loop) of the model if the corresponding accuracy is identified as greater than the accuracy threshold. Further, if the accuracy is at or below the accuracy threshold, the multi-functionality device control computing platform 110 may resume refinement of the model through the corresponding dynamic feedback loop.

Figure 3:
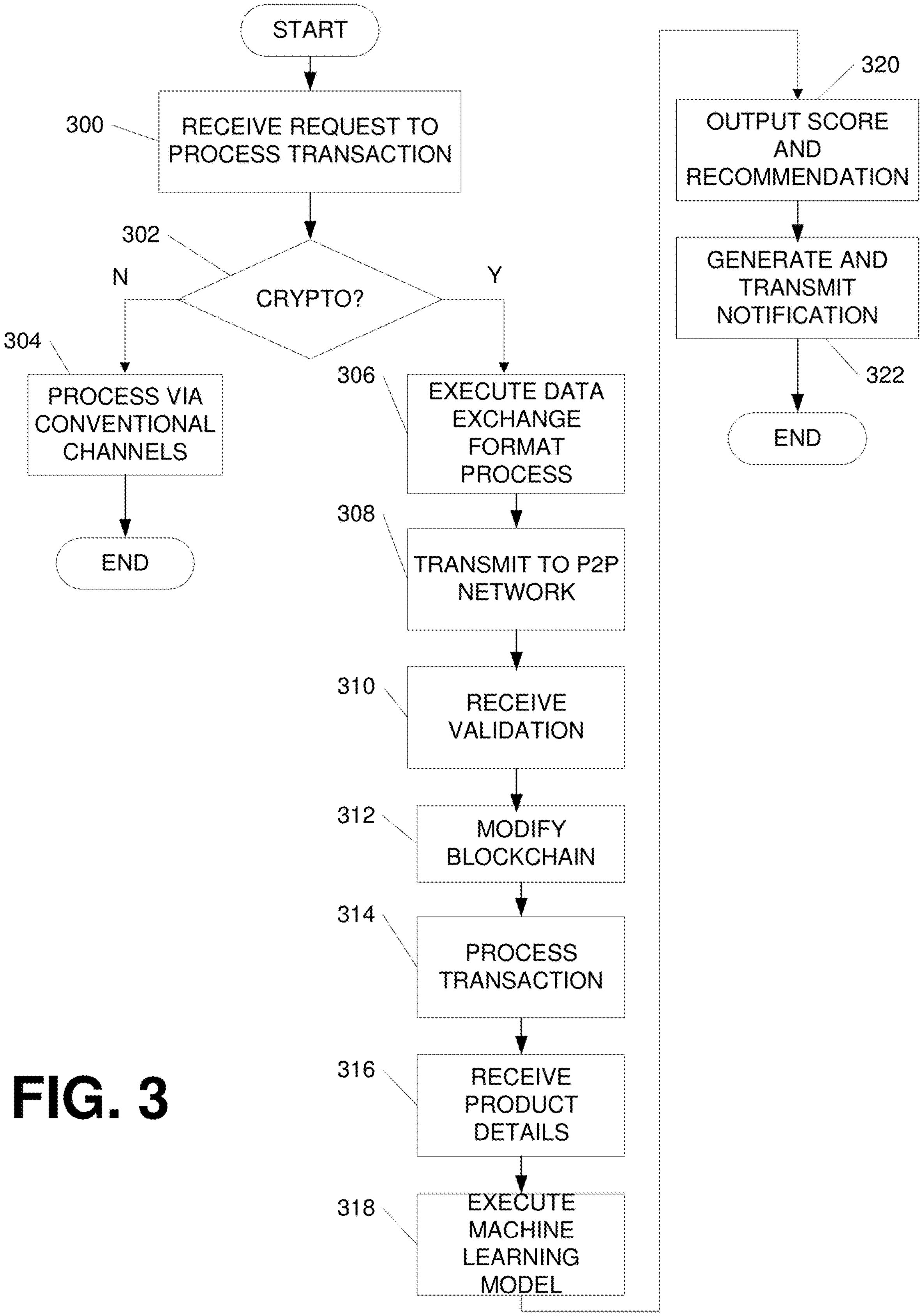
FIG. 3 illustrates an illustrative method for implementing multi-functionality device control functions according to one or more aspects described herein.

FIG. 3 is a flow chart illustrating one example method of implementing multi-functionality device control functions and environment impact evaluation in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as multi-functionality device control computing platform 110 may receive a request to process a transaction. The request may be received from a payment processing device 160, such as a POS device, on-line retailer payment system, or the like. In some examples, the request to process the transaction may include transaction details. In some examples, the transaction details may include a selection of a mode of functionality or processing a transaction selected by a user via a payment device or card 180. For instance, a payment device 180, similar to a debit or credit card, may include three selectable options, each selectable option associated with a different mode of functionality or processing. Accordingly, a user may select a mode of functionality or processing (e.g., debit, credit or cryptocurrency) on-the-fly based on different circumstances of a transaction being processed (e.g., credit for larger dollar transactions, debit or purchases under $5, or the like). In some examples, the selectable options may include physical buttons located on a surface of the payment device 180. In some arrangements, the payment device may further include an LED and/or a raised indicator corresponding to each physical button. Accordingly, the user may select, via one of the selectable options on the payment device, a desired mode of processing or functionality and that selection may be transmitted to, for instance, multi-functionality device control computing platform 110 with, for instance, the request for transaction.

At step 302, a determination may be made as to whether the selected mode of processing is cryptocurrency. If cryptocurrency is not selected (e.g., if debit or credit is selected), the process may proceed to step 304 and the transaction may be processed via conventional systems and arrangements (e.g., via internal entity computing system 120, external entity computing system 150, or the like). In some examples, processing the transaction may include generating and transmitting a notification to payment processing device 160, user computing device 170, or the like.

If, at step 302, cryptocurrency is selected, at step 306, the platform may execute a data exchange format process to orchestrate data transmissions or communication between payment processing system 160 and cryptocurrency processing system 130.

At step 308, the computing platform may transmit or send transaction details to a peer-to-peer (P2P) network of computing devices for validation. At step 310, an indication that the transaction is validated may be received by the platform.

At step 312, the transaction details may be recorded in a blockchain. For instance, a block corresponding to the transaction details may be generated and added to the blockchain. At step 314, the transaction may be processed using cryptocurrency. For instance, the requested transaction may be processed using cryptocurrency associated with a cryptocurrency account associated with the payment device 180, user, or the like.

At step 316, additional information related to the product being purchased and/or the manufacturer of the product may be received. For instance, details associated with materials used to manufacture the product, sustainability efforts associated with the manufacturer, recyclability of the product, and the like, may be received.

At step 318, a machine learning model may be executed using the product details and transaction details as inputs to output an environmental impact score associated with the transaction and one or more recommendations at step 320. Based on the score and the one or more recommendations, at step 322, a notification including the one or more recommendations may be generated and transmitted to a user computing device 170.

Accordingly, aspects described herein are directed to a multi-function payment card or device that can be used to efficiently process credit, debit and cryptocurrency transactions, as well as evaluating the environmental impact of a purchase or transaction. By providing all three modes of processing in a single card, a user has the convenience of carrying one card rather than multiple cards. In addition, the use of blockchain provides additional security to transaction processing.

Further, users might find the use of cryptocurrency daunting because of a lack of integrated support associated with the transactions. The arrangements described herein provide for seamless use of cryptocurrency using a payment device similar in appearance to other devices while providing selectable functionality.

In addition, aspects described herein provide for a carbon modeling system that determines, in real-time or near real-time, how purchases, transactions, and the like, impact the environment. In some examples, one or more incentives, rewards or the like, may be provided to a user for executing transactions having a low environmental impact score or to encourage users to make more environmentally friendly or recommended purchases in subsequent transaction.

As discussed herein, various factors may be considered when determining an environmental impact. For instance, a type or retailer associated with the transaction (e.g., organic food store), materials used to make product, company policies associated with the manufacturer, and the like. While various arrangements discussed herein indicate that a low score indicates a low environmental impact, in some examples, scores may be determined such that points are awarded for more environmentally friendly decisions, such that a higher score would indicate a lower impact on the environment without departing from the invention.

Figure 7:
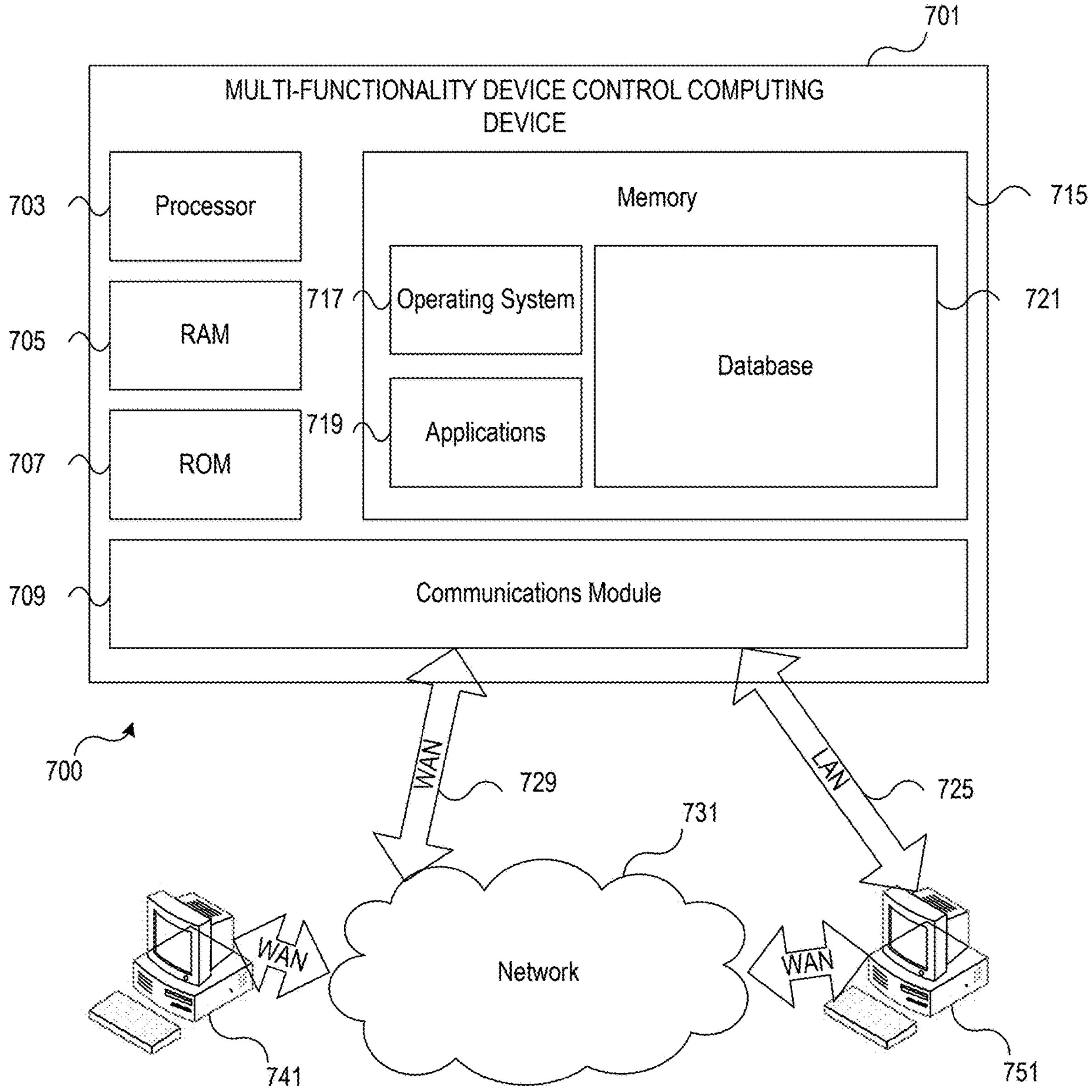
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include multi-functionality device control computing device 701 having processor 703 for controlling overall operation of multi-functionality device control computing device 701 and its associated components, including Random Access Memory (RAM) 705, Read-Only Memory (ROM) 707, communications module 709, and memory 715. Multi-functionality device control computing device 701 may include a variety of computer readable media. Computer readable media may be any available media that may be accessed by device performance evaluation computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by multi-functionality device control computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on multi-functionality device control computing device 701. Such a processor may execute computer-executable instructions stored on a computer-readable medium.

Software may be stored within memory 715 and/or storage to provide instructions to processor 703 for enabling multi-functionality device control computing device 701 to perform various functions as discussed herein. For example, memory 715 may store software used by multi-functionality device control computing device 701, such as operating system 717, application programs 719, and associated database 721. Also, some or all of the computer executable instructions for multi-functionality device control computing device 701 may be embodied in hardware or firmware. Although not shown, RAM 705 may include one or more applications representing the application data stored in RAM 705 while multi-functionality device control computing device 701 is on and corresponding software applications (e.g., software tasks) are running on multi-functionality device control computing device 701.

Communications module 709 may include a microphone, keypad, touch screen, and/or stylus through which a user of multi-functionality device control computing device 701 may provide input, and may also include one or more of a speaker for providing audio output and a video display device for providing textual, audiovisual and/or graphical output. Computing system environment 700 may also include optical scanners (not shown).

Multi-functionality device control computing device 701 may operate in a networked environment supporting connections to one or more remote computing devices, such as computing devices 741 and 751. Computing devices 741 and 751 may be personal computing devices or servers that include any or all of the elements described above relative to multi-functionality device control computing device 701.

The network connections depicted in FIG. 7 may include Local Area Network (LAN) 725 and Wide Area Network (WAN) 729, as well as other networks. When used in a LAN networking environment, multi-functionality device control computing device 701 may be connected to LAN 725 through a network interface or adapter in communications module 709. When used in a WAN networking environment, multi-functionality device control computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:

a payment card including a generally planar surface having a display region and three selectable physical buttons, wherein each button of the three selectable physical buttons is associated with a different mode of processing; and a computing platform, comprising:

at least one processor;

a communication interface communicatively coupled to the at least one processor; and a memory storing computer-readable instructions that, when executed by the at least one processor, cause the computing platform to:

receive, via a payment processing device and from the payment card, a selected mode of processing, wherein selection of the mode of processing causes display of an identifier in the display region;

receive, from the payment processing device, a request to process a transaction, wherein the request to process the transaction includes transaction details;

determine that the selected mode of processing corresponds to a cryptocurrency transaction;

responsive to determining that the selected mode of processing corresponds to a cryptocurrency transaction, execute a data exchange format process, wherein the data exchange format process orchestrates data transmission between the payment processing device and a cryptocurrency processing system;

transmit, to a peer-to-peer network of computing devices, the transaction details;

receive, from the peer-to-peer network of computing devices, validation of the requested transaction based on analysis of the transaction details;

responsive to receiving validation of the requested transaction, generate a block in a blockchain corresponding to the requested transaction;

process the requested transaction using cryptocurrency from an account associated with the payment card and a user associated with the payment card;

receive details of at least one of: a product being purchased via the transaction or a manufacturer of the product being purchased via the transaction, wherein the details are extracted from a machine-readable code associated with the product;

execute a machine learning model, wherein executing the machine learning model includes inputting, to the machine learning model, the transaction details and the received details of at least one of: the product being purchased via the transaction or the manufacturer of the product being purchased via the transaction;

output, based on executing the machine learning model on the inputs, an environmental impact score associated with the transaction;

based on the environmental impact score of the transaction, generate one or more recommendations for subsequent transaction; and transmit, to a user computing device, the one or more recommendations, wherein transmitting the one or more recommendations causes the one or more recommendations to be displayed by a display of the user computing device.

2. The system of claim 1, wherein the generated one or more recommendations for subsequent transaction are generated by the machine learning model.

3. The system of claim 1, wherein the payment card further includes a light emitting diode indicator associated with each physical button of the three selectable physical buttons, wherein selection of a physical button causes a corresponding light emitting diode to illuminate.

4. The system of claim 1, wherein the payment card further includes a raised indicator corresponding to each physical button of the three selectable physical buttons.

5. The system of claim 1, wherein generating a block in a blockchain corresponding to the requested transaction includes modifying the blockchain to add the generated block to the blockchain.

6. The system of claim 1, further including instructions that, when executed, cause the computing platform to:

compare the environmental impact score to one or more thresholds; and based on the comparing, generate the one or more recommendations for subsequent transaction.

7. A method, comprising:

receiving, by a payment card including a generally planar surface having a display region and three selectable physical buttons, wherein each button of the three selectable physical buttons is associated with a different mode of processing, user input selecting a first button of the three selectable physical buttons, wherein the user input causes selection, via the first button, of a selected mode of processing and causes display of an identifier in the display region of the payment card;

receiving, by a computing platform, the computing platform having at least one processor, and memory, and via a payment processing device, and from the payment card, the selected mode of processing;

receiving, by the at least one processor, a request to process a transaction, wherein the request to process the transaction includes transaction details;

determining, by the at least one processor, that the selected mode of processing corresponds to a cryptocurrency transaction;

responsive to determining that the selected mode of processing corresponds to a cryptocurrency transaction, executing, by the at least one processor, a data exchange format process, wherein the data exchange format process orchestrates data transmission between the payment processing device and a cryptocurrency processing system;

transmitting, by the at least one processor and to a peer-to-peer network of computing devices, the transaction details;

receiving, by the at least one processor and from the peer-to-peer network of computing devices, validation of the requested transaction based on analysis of the transaction details;

responsive to receiving validation of the requested transaction, generating, by the at least one processor, a block in a blockchain corresponding to the requested transaction;

processing, by the at least one processor, the requested transaction using cryptocurrency from an account associated with the payment card and a user associated with the payment card;

receiving, by the at least one processor, details of at least one of: a product being purchased via the transaction or a manufacturer of the product being purchased via the transaction, wherein the details are extracted from a machine-readable code associated with the product;

executing, by the at least one processor, a machine learning model, wherein executing the machine learning model includes inputting, to the machine learning model, the transaction details and the received details of at least one of: the product being purchased via the transaction or the manufacturer of the product being purchased via the transaction;

outputting, by the at least one processor and based on executing the machine learning model on the inputs, an environmental impact score associated with the transaction;

based on the environmental impact score of the transaction, generating, by the at least one processor, one or more recommendations for subsequent transaction; and transmitting, by the at least one processor and to a user computing device, the one or more recommendations, wherein transmitting the one or more recommendations causes the one or more recommendations to be displayed by a display of the user computing device.

8. The method of claim 7, wherein the generated one or more recommendations for subsequent transaction are generated by the machine learning model.

9. The method of claim 7, wherein the payment card further includes a light emitting diode indicator associated with each physical button of the three selectable physical buttons, wherein selection of a physical button causes a corresponding light emitting diode to illuminate.

10. The method of claim 7, wherein the payment card further includes a raised indicator corresponding to each physical button of the three selectable physical buttons.

11. The method of claim 7, wherein generating a block in a blockchain corresponding to the requested transaction includes modifying the blockchain to add the generated block to the blockchain.

12. The method of claim 7, further including:

comparing, by the at least one processor, the environmental impact score to one or more thresholds; and based on the comparing, generating, by the at least one processor the one or more recommendations for subsequent transaction.

* * * * *